(12) United States Patent
Sen et al.

(10) Patent No.: US 9,883,342 B2
(45) Date of Patent: Jan. 30, 2018

(54) LOCALIZATION USING ACCESS POINT

(71) Applicant: Hewlett Packard Enterprise Development LP, Houston, TX (US)

(72) Inventors: Souvik Sen, Palo Alto, CA (US); Jung Gun Lee, Palo Alto, CA (US); Alexander Timothy Mariakakis, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/114,875

(22) PCT Filed: Jan. 31, 2014

(86) PCT No.: PCT/US2014/014268
§ 371 (c)(1),
(2) Date: Jul. 28, 2016

(87) PCT Pub. No.: WO2015/116202
PCT Pub. Date: Aug. 6, 2015

(65) Prior Publication Data
US 2017/0013402 A1    Jan. 12, 2017

(51) Int. Cl.
*H04W 4/02*       (2009.01)
*H04W 64/00*      (2009.01)
*G01S 5/02*       (2010.01)
*G01S 5/10*       (2006.01)

(52) U.S. Cl.
CPC .......... *H04W 4/023* (2013.01); *G01S 5/0263* (2013.01); *G01S 5/0273* (2013.01); *G01S 5/0294* (2013.01); *G01S 5/10* (2013.01); *H04W 64/00* (2013.01); *H04W 4/027* (2013.01)

(58) Field of Classification Search
CPC ................................ H04W 4/02; H04W 4/023
USPC .......................................... 455/456.1–456.5
See application file for complete search history.

(56) References Cited

U.S. PATENT DOCUMENTS

| 7,116,632 B2 | 10/2006 | Alapuranen |
| 7,576,694 B2 | 8/2009 | Anjum et al. |
| 8,521,091 B2 | 8/2013 | Miscopein et al. |
| 2008/0120062 A1 | 5/2008 | Lee et al. |
| 2008/0248741 A1 | 10/2008 | Alizadeh-Shabdiz |
| 2009/0028112 A1 | 1/2009 | Attar et al. |

(Continued)

FOREIGN PATENT DOCUMENTS

| JP | 2010-537520 A | 12/2010 |
| JP | 10-2011-0012899 A | 2/2011 |
| WO | WO-2009054010 | 4/2009 |

OTHER PUBLICATIONS

Dobbins, R et al, "Software Defined Radio Localization Using 802.11 style Communications" Apr. 28, 2011.

(Continued)

*Primary Examiner* — Michael T Vu
(74) *Attorney, Agent, or Firm* — Hewlett Packard Enterprise Patent Department

(57) ABSTRACT

Localizing a location of a mobile device may be performed by obtaining times of flights between the mobile device and an access point at a first and second location. A heading of the mobile device and a distance between the first and second location may be further obtained. The times of flight, heading, and distance may be used to localize the second location.

14 Claims, 6 Drawing Sheets

(56) References Cited

U.S. PATENT DOCUMENTS

| | | | |
|---|---|---|---|
| 2013/0051255 A1 | 2/2013 | Estevez et al. | |
| 2013/0122935 A1* | 5/2013 | Das | H04W 4/028 |
| | | | 455/456.3 |
| 2013/0194951 A1 | 8/2013 | Kim | |
| 2013/0225200 A1 | 8/2013 | Hamida et al. | |
| 2014/0274115 A1* | 9/2014 | Michalson | H04W 4/028 |
| | | | 455/456.1 |

OTHER PUBLICATIONS

Karapistoli, E et al, "An Overview of the IEEE 802.15.4a Standard", Jan. 27, 2010.

Zheng, Yang et al, "From RSSI to CSI: Indoor Localization via Channel Response" ACM Computing Surveys, V46(2), Article 25, Nov. 2013.

\* cited by examiner

LOCALIZATION USING ACCESS POINT

BACKGROUND

Wireless access points (APs) are sometimes utilized for localization indoors or in other places where satellite navigation is unavailable. Additionally, APs may be used to refine the precision of a satellite navigation-based localization. An example of AP-based localization is W-Fi fingerprinting. In Wi-Fi fingerprinting, the radio frequency (RF) environment is measured at many points in a region where localization will be available. Later, a device's location may be determined by measuring the local RF characteristics at the device and comparing them to the previously measured RF environment.

BRIEF DESCRIPTION OF THE DRAWINGS

Certain examples are described in the following detailed description and in reference to the drawings, in which.

DETAILED DESCRIPTION OF SPECIFIC EXAMPLES

Some aspects of the disclosed technology may allow localization using a single wireless access point (AP). For example, a single AP may be used to position a connected device indoors or in another location with poor satellite navigation availability. Implementations of the technology may perform localization without fingerprinting the wireless environment, requiring a high density of APs, or frequent channel scanning. This may reduce a device's energy consumption during indoor localization and allow normal data communication during continuous location tracking.

Figure 1:
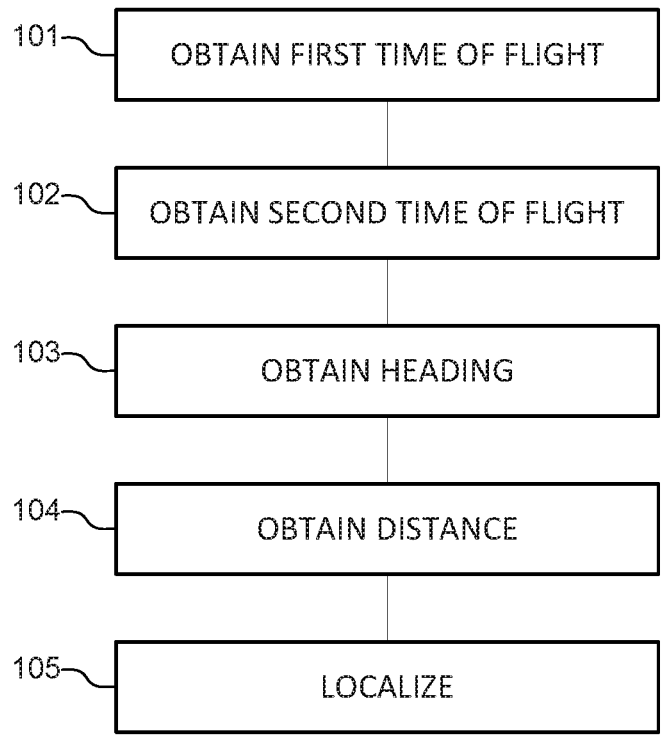
FIG. 1 illustrates an example method of localization.
Figure 2:
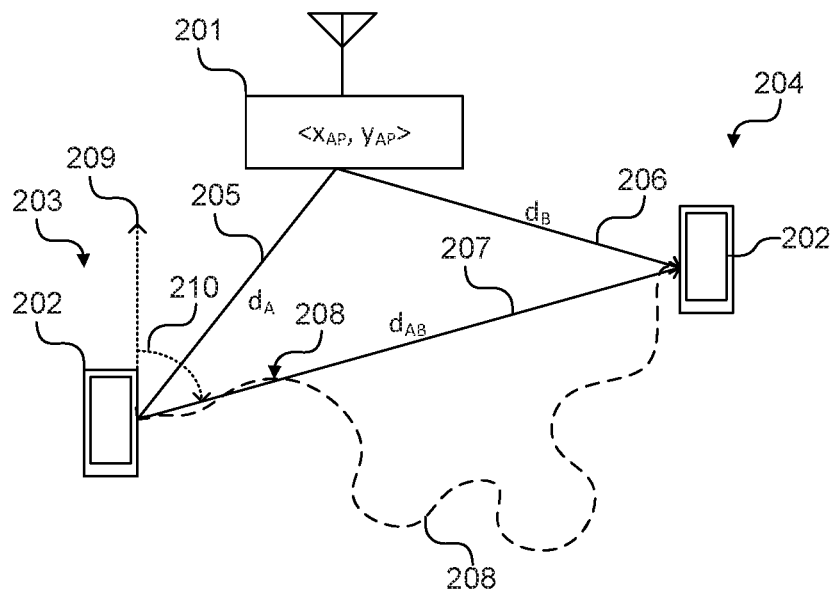
FIG. 2 illustrates an example of localization of a mobile device in relation to an access point as the device moves from a first position to a second position.

FIG. 1 illustrates an example method of localization. For example, the illustrated method may be performed by an AP. As further examples, the illustrated method may be performed by a mobile device, such as a smartphone or tablet, or by an AP and mobile device in combination. For example, FIG. 2 illustrates an example of localization of a mobile device 202 in relation to an AP 201 as the device 202 moves from a first position 209 to a second position 204. In this example, the AP 201, the device 202, or both in combination may perform the method illustrated in FIG. 1.

The example method may include block 101. In some cases, block 101 may include obtaining a first time of flight between a mobile device at a first location and an AP. For example, the AP 201 or device 202 may obtain a first time of flight between device 202 and AP 201 when the device 202 is at the first location 203. The time of flight may be the round trip propagation time of signals transmitted between an AP and a mobile device. As described below, the time of flight may be used to determine the distance between the AP and device. For example, in FIG. 2, the time of flight may be used by AP 201 or device 202 to discover the distance $d_A$ 205 between the AP 201 and the device 202 at location 203.

In some cases, time of flight may be determined by exchange of a data packed and an acknowledgement packet (ACD) between the AP and the device. Timestamps may be extracted from the data and ACK to determine the time of flight. For example, in an 802.11 standard wireless local area network (WLAN), time of departure of the data packet may be computed by the AP may be computed by the AP when the data packet is sent out at the physical layer (PHY). On correct reception of the packet, the device may wait for a short interface space (SIFS) time and then send an ACK. The AP may then estimate the time of arrival of the ACK packet using preamble detection at the PHY layer. The time of flight may be determined as the time of arrival minus the time of departure and the SIFS.

The example method may also include block 102. In some cases, block 102 may include obtaining a second time of flight between the mobile device at a second location and the access point. For example, block 102 may comprise the AP 201 or device 202 obtaining the second time of flight when the second device 202 is at the second location 204. In some implementations, block 102 may be performed in a similar manner as block 101. For example, the second time of flight may be determined by a second data-ACK exchange between the AP and the device. In some cases, the second time of flight may be used to determine a second distance between the device and the AP. For example, in FIG. 2, the second time of flight may be used by the AP 201 or the device 202 to determine the distance $d_B$ 206 between the AP 201 and the device 202 at the second location 204.

In some implementations, blocks 101 and 102 may be performed in succession to reduce the effect of multipath. In some cases, small movements in the device may create large changes in the signal strength of indirect paths, while leaving the direct path contribution relatively stable. Accordingly, in some cases, the time of flight is calculated multiple times in a predetermined time period while the device is at the first or second location. For example, the time of flight may be twice in one second. In these implementations, blocks 101 and 102 may include using the shortest calculated time of flight as the time of flight between the mobile device and the AP.

Figure 3:
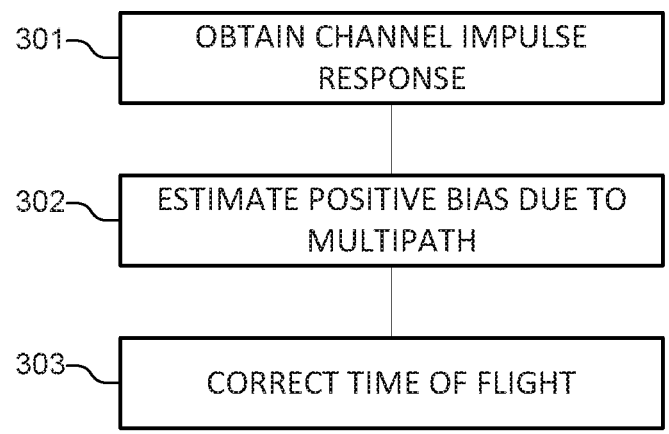
FIG. 3 illustrates an example method of determining times of flight for use in localization.

In some implementations, blocks 101 and 102 may include determining the time of arrival of signals propagating on a direct path between the AP and the device. For example, in a multipath environment, such as indoors, the strongest signal may not correlate with the direct path between the AP and the device. For example, a wall between the AP and the device may make a path that bounces around the wall stronger than the path through the wall. This may introduce an error in using time of flight to calculate distance between the AP and device. For example, in FIG. 2, multipath effects may cause distances 205 or 206 to be appear larger than they are. Accordingly, in some implementations, blocks 101 and 102 may include performance of the example method illustrated in FIG. 3.

The example method may include block 301. Block 301 may include obtaining a channel impulse response. For example, block 301 may include obtaining a channel impulse response for the multipath channel used to send the ACK between the device and AP. For example, the channel impulse response may be obtained by performing an inverse Fourier transform, such as the Inverse Fast Fourier Transform (IFFT) on channel state information (CSI) obtained at the PHY during detection of the ACK.

Figure 4:
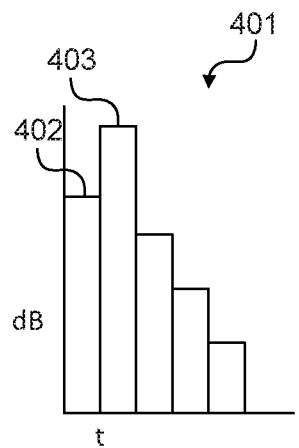
FIG. 4 illustrates an example channel impulse response 401 in a multipath environment.

The example method may also include block 302. Block 302 may include using the channel impulse response to estimate a positive bias due to multipath. For example, the channel impulse response may be used to determine if there is an arrived signal that comes before the strongest signal. For example, FIG. 4 illustrates an example channel impulse response 401 in a multipath environment. Element 403 corresponds to an indirect path that providing the strongest signal. Element 402 corresponds to the earliest arriving signal, which corresponds to the direct path. Block 302 may include determining the difference in the arrival time of the strongest and the direct path. This difference may reflect a positive bias in the Time of Flight created by strong multipath signals. Because the correction depends on the resolution of the channel impulse response, it is an estimate of a positive bias due to multipath. For example, in a 40 MHz bandwidth channel, the resolution of the channel impulse response may be up to 25 ns.

The example method may also include block 303. Block 303 may include using the positive bias to correct the first time of flight or the second time of flight. For example, the positive bias may be subtracted from the time of arrival to correct the multipath effect on the time of arrival. By computing the time of flight with the correct time of arrival, the effect of multipath on the time of flight may be reduced. In turn, this may reduce the error in distance calculation. For example, with a 25 ns resolution in the channel impulse response, the calculation of the distance in blocks 101 or 102 may be estimated to within 7.5 m of the actual distance.

Figure 5:
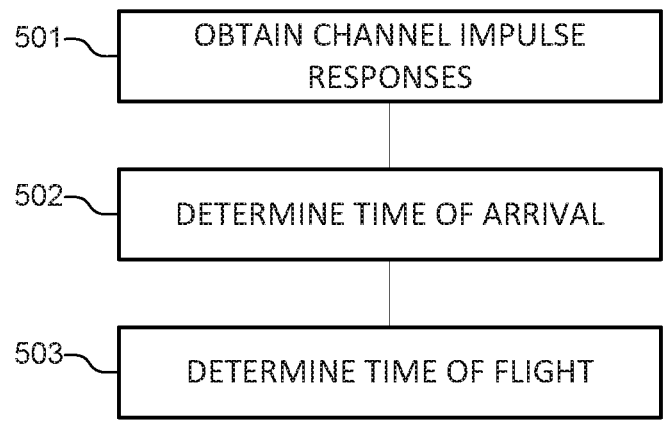
FIG. 5 illustrates an example method of using multiple antennas to obtain a first or second time of flight.

In some implementations, the AP may have multiple antennas. In these implementations, blocks 101 or 102 may include the use of multiple antennas at the AP to obtain the first or second time of flight. In some cases, the PHY of the AP may report a single time of arrival of a packet, even when multiple antennas are present. For example, the PHY layer may synchronize with the strongest arriving signal across all antennas and report the corresponding time of arrival. In some cases, this may correspond to an indirect signal path. In some implementations, blocks 101 or 102 may reduce this multipath error using multiple antennas. For example, FIG. 5 illustrates an example method of using multiple antennas to obtain the first or second time of flight.

The example method may include block 501. Block 501 may include obtaining a plurality of channel impulse responses of a corresponding plurality of antennas of the access point. For example, the plurality of channel impulse responses may be obtained by performing an inverse Fourier transform on a corresponding plurality of CSI of the plurality of antennas.

The example method may also include block 502. Block 502 may include determine the time of arrival using the plurality of channel impulse responses. For example, this may include determining the strongest component across all the CIRs. The difference between the time of the strongest component and the first component across all the CIRs may be used to determine a positive bias in the time of arrival. Block 502 may include subtracting this positive bias from the time arrival.

The example method may also include block 502. Block 503 may include using the time of arrival determined in block 502 to determine the first time of flight or the second time of flight. For example, the block 502 may be performed to determine the time of flight using time of arrival as described above.

Figure 6:
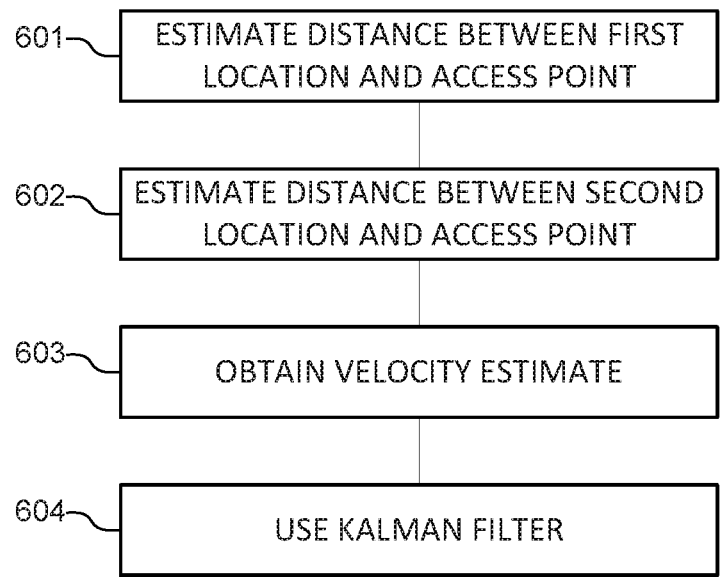
FIG. 6 illustrates a method of using Kalman filtering to correct an error in an estimate of the distance between the second location and the access point.

In some implementations, localization may be performed multiple times to track a moving device. For example, in FIG. 2, the method of FIG. 1 may be performed iteratively by the AP 201 or the device 202 to track the device as it moves on the path 208. In some implementations, the results of a previous localization may be used to refine an estimate of a subsequent distance measurement. In some cases, additional data may be used to refine the distance measurement. For example, FIG. 6 illustrates a method of using Kalman filtering to correct an error in an estimate of the distance between the second location and the access point.

The example method may include blocks 601 and 602. Block 601 may include using the first time of flight determined in block 101 to estimate a second distance between the first location and the access point. Block 602 may include using the second time of flight determined in block 102 to estimate a third distance between the first location and the access point. For example, the first and second distances may be estimated using the time of flight as described above with respect to block 105.

The example method may also include block 603. Block 603 may include obtaining a velocity estimate of the mobile device. For example, the velocity estimate may be determined with respect to the AP. In some implementations, the velocity estimate may be obtained using accelerometer data and the heading determine in block 103. In some implementations, block 603 may include correcting the velocity estimate to take account of physical turns taken by the user. For example, gyroscope data may be used to signal a turn by detecting an orientation change. After a turn, the velocity estimate may be determined from the velocity estimate before the turn and the orientation change determined from the gyroscope.

The example method may also include block 604. Block 604 may include using a Kalman filter applied to the velocity estimate to correct an error in the estimate of the third distance. For example, the Kalman filter may track the estimated distance of the device as well as the relative velocity with respect to the AP. Accordingly, in an implementation using a Kalman filter, performance of block 102 may include performance of the method of FIG. 6.

Returning to the example method of FIG. 1, the example method may also include block 103. In some cases, block 103 may include obtaining a heading of the mobile device. For example, the heading may be determined from a compass on the device. In some cases, the heading of the mobile device may be corrected to reflect the heading of the mobile device's user. For example, if the user is holding the device at an arbitrary angle (for example, if the device is in the user's pocket), the heading of the mobile device may be determined such that the heading matches the user's heading. For example, the heading may be determined by measuring the component of acceleration of the device perpendicular to gravity. The direction of this component may be used to correct the device's compass heading to reflect the device's heading during movement. For example, in FIG. 2, the device's 202 compass heading may be vector 209, which may be corrected to reflect the heading 210 of the device as it travels on path 208 to location 204. In implementations where the method is performed by the AP, block 103 may include obtaining this heading information from the device.

In some environments, such as indoors, background magnetic fields may interfere with compass readings. In some examples, obtaining the heading may include comparing a measured magnetic field characteristic to a reference magnetic field characteristic to determine if the measured magnetic field characteristic is valid. For example, the AP may store an estimate of the Earth's magnetic field strength and direction at its location. Block 103 may include the device measuring the magnetic field strength and direction. The device or the AP may compare the measured characteristics to the reference characteristics to determine if the magnetometer has a valid reading or a spurious reading caused by interference. If the reading is spurious, block 103 may include repetitively measuring the magnetic characteristics until a valid reading is obtained.

Although these characteristics may vary across the surface of the earth, they may be static within the wireless range of AP. Accordingly, in the absence of interference, the rate of change of the magnetic field strength as the device moves in the environment should be zero. In some implementations, comparing the measured magnetic field characteristic to the reference magnetic field characteristic may include determining a rate of change of the magnetic field strength. For example, the rate of change may be determined by obtaining multiple measurements from the device's magnetometer.

In a particular implementation, comparing the measured magnetic field characteristic to the reference magnetic field characteristic may include determining a confidence metric M as:

$$M = \frac{1}{2}\left(\mu_1 \frac{dm_{meas}}{dt} + \mu_2 |m_{meas} - m_{ref}|\right), \text{ where } \frac{dm_{meas}}{dt}$$

is the rate of change of the measured magnetic field, $m_{meas}$ is the measured magnetic field strength, $m_{ref}$ is the reference magnetic field strength, and $\mu_1$ and $\mu_2$ are empirically determined constants [Can you provide an estimate for μ1 and μ2?]. In this implementation, block 103 may also include comparing the confidence metric to a threshold. For example, the threshold may be a value between 0.6 and 0.75. If the metric is above the threshold then the compass reading is considered valid and a heading is determined. Otherwise, the compass reading is considered invalid and the process is repeated until the metric exceeds the threshold.

The example method may also include block 104. Block 104 may include obtaining a distance between the first location and the second location. For example, in FIG. 2, AP 201 or device 202 may obtain the distance $d_{AB}$ 207 between location 203 and location 204. In some cases, the distance between the first location and the second location may be determined by dead reckoning. For example, the distance may be obtained by using the device's accelerometer to track a user's step length and frequency as they travel on a path between the first location and the second location. For example, in FIG. 2, AP 201 or device 202 may track the user's step length and frequency as they travel on path 208. Additionally, orientation information may be used to use the path distance to obtain the direct distance between the first location and the second location.

In some implementations, gyroscope information from the device may also be used to determine the distance between the first location and the second location. For example, when integrated over time, gyroscope data may yield relative angular information, which may be used in the dead reckoning process to detect turns made by a user. Additionally, in some implementations, false turns may be ignored. For example, a false turn may occur if the user raises the device to make a call. Such a false turn may be detected by measuring a gravity vector reported by the device. For example, when a user raises a phone to make a call the gravity vector may change from the z axis to somewhere on the xy plane. Accordingly, in some implementations if the gravity vector makes an abrupt change, the integration of gyroscope values may be reset to avoid incorporating the false turn into the dead reckoning process.

Figure 7:
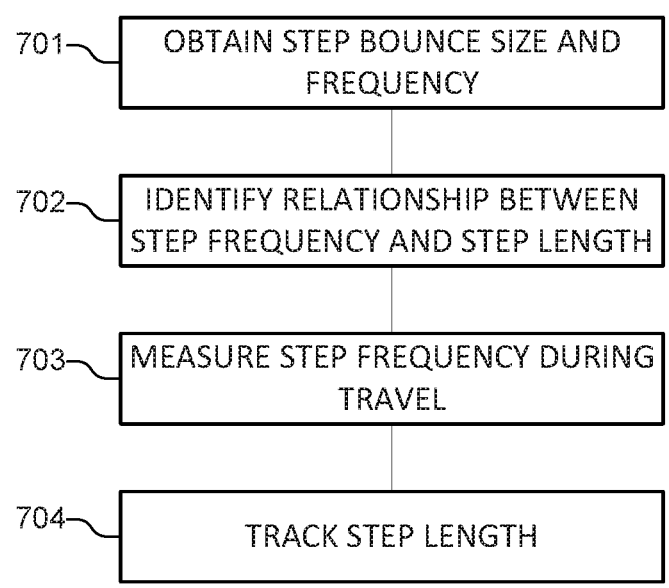
FIG. 7 illustrates an example of identifying a relationship between step frequency and step length and tracking the step length of the user.

In some implementations, the step length of the user may be determined using one or more default values. For example, block 104 may include obtaining physical information relating to the user such as height and weight. The physical information may be used to select a step length value from the default values. Additionally, a user's step length may be proportional to step frequency. In some cases, block 104 may use an average relationship between step frequency and step length to track a user's step length based on step frequency. In other cases, block 104 may comprise determining a relationship between step frequency and step length for the user. FIG. 7 illustrates an example of identifying a relationship between step frequency and step length and tracking the step length of the user. In some implementations, this method may be performed as an aspect of block 104.

The example method of FIG. 7 may include block 701. Block 701 may include obtaining a user's step bounce factor and step frequency. A user's step bounce size may be the vertical displacement of the user's hip as she walks. In some implementations, the user's step bounce factor may be the user's step bounce size or a value proportional to the user's step bounce size.

In some implementations, the step bounce size may be characterized using the device's accelerometer. The for example, the accelerometer may report the total acceleration $\langle a_x, a_y, a_z \rangle$ experienced by the phone. This value is the sum of the acceleration due to gravity $\langle g_x, g_y, g_z \rangle$ and the acceleration exerted by the user $\langle f_x, f_y, f_z \rangle$. In some implementations, block 701 may include determining the scalar projection of the acceleration vector onto the gravity vector. In some implementations, the step bounce size may be calculated as the difference between the maximum scalar projection and the minimum scalar projection. In other implementations, the bounce factor may be determined as the standard deviation of the scalar projection values over the course of a step, as follows:

$$\text{bounce factor} \propto std\left(\frac{\langle a_x, a_y, a_z \rangle \cdot \langle g_x, g_y, g_z \rangle}{|g_x, g_y, g_z|}\right).$$

The method may further include block 702. Block 702 may include using the step bounce factor and a step frequency to identify a relationship between step frequency and step length for the user. For example, the system may store a plurality of different relationships between step frequency and step bounce factor. The plurality of relationships may cover the relationships of a sampling of the population. Block 702 may include selecting the closest relationship from the plurality. The population exhibiting the selected relationship between bounce factor and step frequency may have a characteristic relationship between step frequency and step length. For example, the relationship may be a particular linear relationship between step frequency and step length. Accordingly, block 702 may include selecting the relationship between strep frequency and step length that corresponds the selected relationship between step bounce factor and step frequency.

The method may further include block 703. Block 703 may include measuring the user's step frequency as the mobile device travels from the first location to the second location. For example, this may be performed using accelerometer data from the mobile device.

The method may further include block 704. Block 704 may include using the relationship between step frequency and step length and the measured step frequency to track the step length the mobile device travels from the first location to the second location. In turn, the tracked step length may be used to obtain the distance between the first location and the second location.

Returning to FIG. 1, in some implementations, the method may also include block 105. Block 105 may include using the first time of flight, the second time of flight, the heading, and the distance to localize the second location. For example, the second location may be localized by determining a latitude and longitude of the second location. As another example, the second location may be localized by determining where the second location is with respect to the access point. For example, the second location may be localized by determining a heading and distance from the access point to the second location.

In some cases, block 105 may include using the first time of flight to determine a first distance between the AP and the device at the first location. Block 105 may also include using the second time of flight to determine a second distance between the AP and the device at the second location. For example, the distances may be obtained as c*ToF/2, where c is the speed of light, and ToF is the time of flight. The three distances form a triangle with the AP at one vertex, the first location at the second vertex, and the second location at the third vertex. For example, in FIG. 2, the triangle is formed by sides 205, 206, 207 with the AP 201 at a vertex. In some implementations, the AP's location, such as its latitude and longitude, is known. For example, the AP may have a GPS module or may receive its location from a connected device or system administrator. The length constraints determine a unique triangle, but may be insufficient to find the coordinates of the second location. However, the absolute heading of the mobile device may be used to determine the heading of the line between the first location and the second location. This may be used to determine the orientation of the triangle in a 2D plane, and therefore, the coordinates of the second location.

Additionally, in some cases, there may still be some ambiguity in the coordinates of the second location. For example, in FIG. 2, a triangle reflected about the line parallel to line 207 that intersects with AP 201 may meet the same heading and distance constraints. In some cases, the ambiguity may be resolved with knowledge of valid and invalid locations in the localization environment around the AP. In other cases, the ambiguity may be resolved by determining the direction of the device at a point intermediate the first location and the second location. For example, at point 208, the device 202 moves towards the AP 201. However, if the reflected triangle were accurate, the device 202 would be moving away from the AP 201. Accordingly, in some implementations, block 105 may include using intermediate direction information to resolve ambiguity in the localization of the second location.

Figure 8:
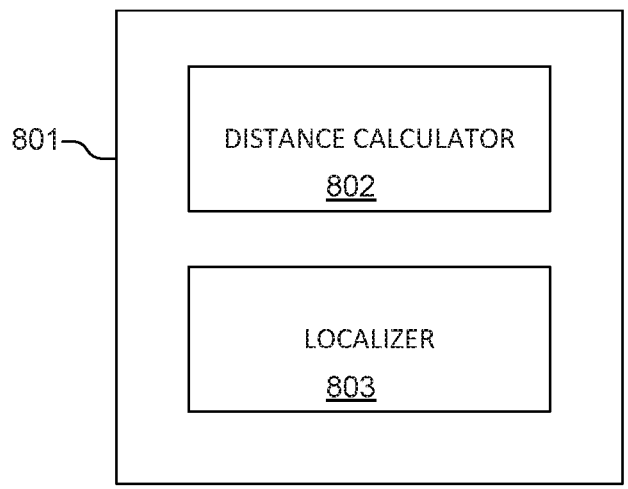
FIG. 8 illustrates an example system having a distance calculator and a localizer.

FIG. 8 illustrates an example system 801 having a distance calculator 802 and a localizer 803. For example, the system 801 may be a mobile device or wireless access point capable of performing the method of FIG. 1. As an example, the system 801 may be a mobile device 202 or AP 201 as described with respect to FIG. 2.

The example system 801 may include a distance calculator 802. For example, the distance calculator 802 may be implemented in hardware, as software stored on a non-transitory computer readable medium, or a combination thereof. The distance calculator 802 may be configured to use a first time of flight to determine a first distance between an access point and a mobile device at a first location. For example, the distance calculator 802 may be configured to determine the first time of flight as described with respect to block 101 of FIG. 1. As another example, the distance calculator 802 may be configured to obtain the first time of flight from another device. For example, if the system 801 is the mobile device, the first time of flight may be calculated by the access point and transmitted to the mobile device. The distance calculator 802 may be configured to use the first time of flight to determine the first distance as described above.

The distance calculator 802 may further be configured to use a second time of flight to determine a second distance between the access point and the mobile device at a second location. For example, the distance calculator 802 may be configured to determine the second time of flight as described with respect to block 102 of FIG. 1. As another example, the distance calculator 802 may be configured to obtain the second time of flight from another device. The distance calculator 802 may be further configured to use the second time of flight to determine the second distance as described above.

The distance calculator 802 may be further configured to obtain a third distance between the first location and the second location. For example, the distance calculator may be configured to obtain the third distance as described with respect to block 104 of FIG. 1.

In further implementations, the distance calculator 802 may be configured to use a fourth distance between the access point and the mobile device and a velocity estimate of the mobile device to determine the second distance using a Kalman filter. In these implementations, the fourth distance may be calculated before the second distance. For example, in these implementations, the distance calculator may be configured to perform the method of FIG. 6.

The example system 801 may further include a localizer 803. The localizer 802 may use the first, second, and third distances to localize the second location. For example, the localizer 803 may be implemented in hardware, as software stored on a non-transitory computer readable medium, or a combination thereof. In some implementations, the localizer 803 may be configured to perform block 105 of FIG. 1.

Figure 9:
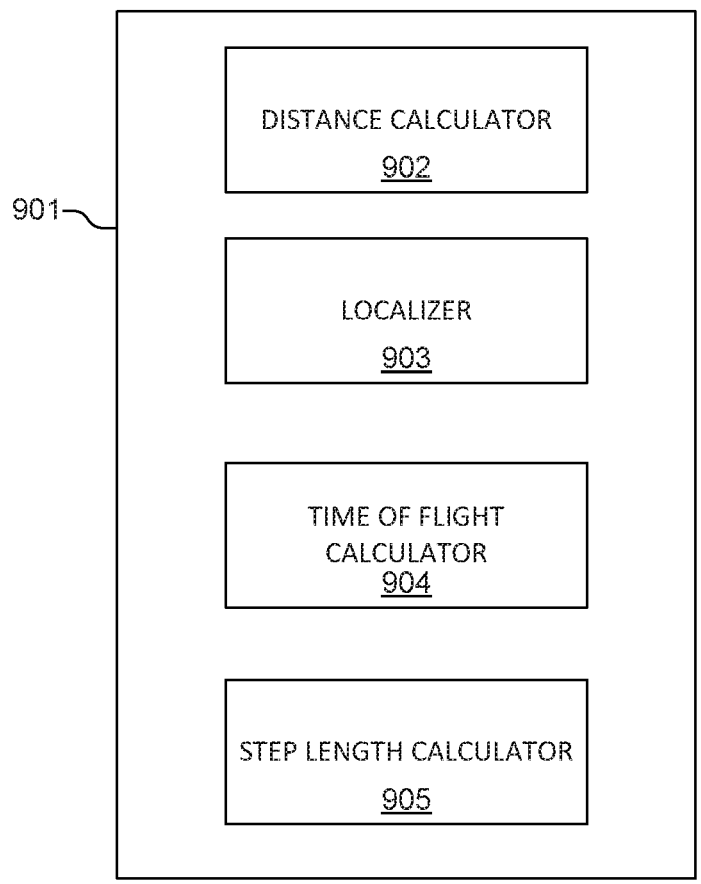
FIG. 9 illustrates a second example system including a distance calculator, a localizer, a time of flight calculator, and a step length calculator.

FIG. 9 illustrates a second example system 901 including a distance calculator 902, a localizer 903, a time of flight calculator 904, and a step length calculator 905. In some implementations, these modules may be implemented in hardware, as software stored on a non-transitory computer readable medium, or a combination thereof. For example, the system 901 may be a mobile device or wireless access point capable of performing the method of FIG. 1.

The system 901 may include a distance calculator 902 and a localizer 903. These modules may be implemented as described with respect to the distance calculator 802 and localizer 803 of FIG. 8.

Additionally, the system 901 may include a time of flight calculator 904. In some cases, the time of flight calculator 904 may provide times of flight to the distance calculator 902. The time of flight calculator 904 may determine a first time of flight and a second time of flight as described with respect to blocks 101 and 102 of FIG. 1. In some cases, the time of flight calculator 904 may determine the first or second time of flights as described with respect to FIG. 3.

In some implementations, the time of flight calculator 904 may be configured to obtain a channel impulse response for a channel between the access point and the mobile device. The time of flight calculator 904 may be further configured to use the channel impulse response to determine if a time of arrival of a packet from the mobile device to the access point corresponds to a reflected path between the mobile device and the access point. If the time of arrival corresponds to a reflected path, the time of flight calculator 904 may use the channel impulse response to obtain a time of arrival correction. The calculator 904 may then use the time of arrival and time of arrival correction to calculate the first time of flight or the second time of flight.

In further implementations, the time of flight calculator 904 may be configured to obtain a plurality of channel impulse responses for a plurality of signal paths between the mobile device and a corresponding plurality of antennas of the access point. In these implementations, the calculator 904 may be configured to estimate a time of arrival by combining a plurality of largest channel impulse response components of the plurality of channel impulse responses. The calculator 904 may then use the time of arrival to calculate the first time of flight or the second time of flight.

In further implementations, the time of flight calculator 904 may be configured to combine a plurality of times of arrivals from a plurality of transmissions received from the mobile device to calculate a combined time of arrival. In these implementations, the time of flight calculator 904 may be configured to use the combined time of arrival to calculate the first time of flight or the second time of flight.

The example system 901 further includes a step length calculator 905. The step length calculator may be configured to track the step lengths of the user and to provide those lengths to the distance calculator 902. The distance calculator 902 may use this information to determine the third distance between the first location and the second location. In some implementations, the step length calculator 905 may determine the step length as described with respect to FIG. 7. For example, the step length calculator 905 may determine a step length of a user of the mobile device by mapping a step bounce factor of the user to a relationship between step frequency and step length and tracking a step frequency of the user. The step length calculator 905 may be further configured to provide a plurality of step lengths obtained while the user moves from the first location to the second location to the distance calculator.

Figure 10:
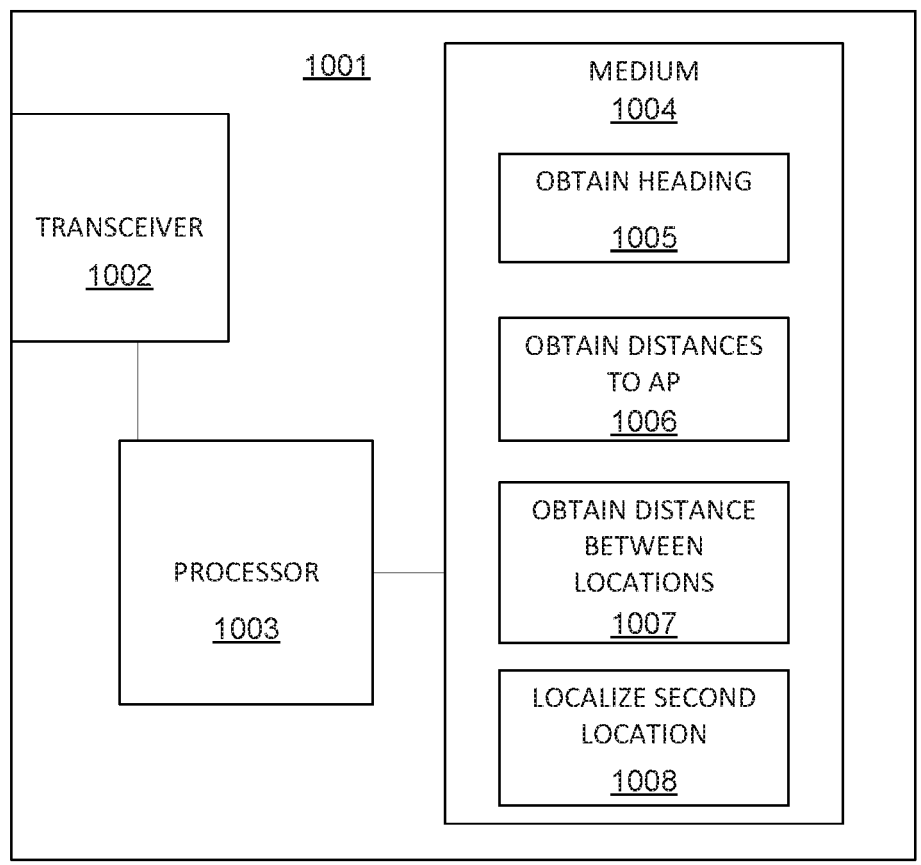
FIG. 10 illustrates an example system including a transceiver, processor, and non-transitory computer readable medium.

FIG. 10 illustrates an example system 1001 including a transceiver 1002, processor 1003, and non-transitory computer readable medium 1004. For example, the system 1001 may be an implementation of an example system such as system 801 of FIG. 8 or system 901 of FIG. 9. In some cases, the system 1001 may be a mobile device, such as the mobile device 202 of FIG. 2. In other cases, the system 1001 may be a wireless access point, such as access point 201 of FIG. 2.

The processor 1003 may be configured to execute instructions stored on the non-transitory computer readable medium 1004. For example, the non-transitory computer readable medium 1004 may be any type of volatile or non-volatile memory or storage, such as random access memory (RAM), flash memory, or a hard disk. When executed, the instructions may cause the processor 1003 to perform a method of localization, such as the method described with respect to FIG. 1.

The example medium 1004 may store instructions 1005. The instructions 1005 may be executable by the processor 1003 to obtain a heading of a mobile device. For example, the instructions 1005 may be executable by the processor to perform block 103 of the method of FIG. 1. As a further example, the instructions 1005 may be executable by the processor 1003 to use the transceiver 1002 to obtain the heading. For example, the system 1001 may be a wireless access point and may use the transceiver 1002 to obtain the heading from the mobile device.

The example medium 1004 may further store instructions 1006. The instructions 1006 may be executable by the processor 1003 to obtain a first distance from the mobile device to an access point when the mobile device is at a first location. The instructions 1006 may be further executable by the processor 1003 to obtain a second distance from the mobile device to the access point when the mobile device is at the second location. For example, the instructions 1006 may be executable by the processor 1003 to perform blocks 101 and 102 of the method of FIG. 1.

The example medium 1004 may further store instructions 1007. The instructions 1007 may be executable by the processor 1003 to obtain a distance between the first and second locations. For example, the instructions 1007 may be executable by the processor 1003 to track a step frequency of a user of the mobile device as the user travels from the first location to the second location. Additionally, the instructions 1007 may be executable by the processor 1003 to use a relationship between step frequency and step length to determine a third distance between the first location and the second locations.

In some implementations, the instructions 1007 may be executable by the processor 1003 to obtain a step bounce factor of the user and use the step bounce factor to identify the relationship between step frequency and step length. For example, the instructions 1007 may be executable to obtain the step bounce factor by determining the standard deviation of a scalar projection of an acceleration measurement onto a gravitational measurement. The instructions 1007 may be further executable to obtain a second step frequency, and use the second step frequency and the step bounce size to identify the relationship.

The example medium 1004 may further store instructions 1008. The instructions 1008 may be executable by the processor 1003 to localize the second location. For example, the instructions 1008 may be executable by the processor 1003 to use the first distance, the second distance, the third distance, and the heading to localize the second location. For example, the localization may be performed as described above.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising:
obtaining a first time of flight between a mobile device at a first location and an access point;
obtaining a second time of flight between the mobile device at a second location and the access point;
obtaining a heading of the mobile device;
obtaining a distance between the first location and the second location;
using the first time of flight, the second time of flight, the heading, and the distance to localize the second location; wherein:
at least one of the first time of flight or the second time of flight is obtained using a channel impulse response to estimate a positive bias due to multipath and using the positive bias to calculate the first time of flight or the second time of flight.

2. The method of claim 1, further comprising obtaining at least one of the first time of flight or the second time of flight by:
obtaining a plurality of channel impulse responses of a corresponding plurality of antennas of the access point, the channel impulse response being one of the plurality of the channel impulse responses;
combining a plurality of largest components of the channel impulse responses to determine the positive bias;
using the positive bias to determine a time of arrival; and
using the time of arrival to determine the first time of flight or the second time of flight.

3. The method of claim 1, further comprising:
using the first time of flight to estimate a second distance between the first location and the access point;
using the second time of flight to estimate a third distance between the second location and the access point
obtaining a velocity estimate of the mobile device; and
using a Kalman filter applied to the velocity estimate to correct an error in the estimate of the third distance.

4. The method of claim 1, further comprising obtaining the distance by using the accelerometer data to track a step length of a user of the mobile device as the mobile device travels from the first location to the second location by:
using a step bounce factor and a step frequency to identify a relationship between step frequency and step length for the user;
measuring the user's step frequency as the mobile device travels from the first location to the second location; and
using the relationship and the measured step frequency to track the step length as the mobile device travels from the first location to the second location.

5. The method of claim 1, further comprising:
obtaining the heading by comparing a measured magnetic field characteristic to a reference magnetic field characteristic to determine if the measured magnetic field characteristic is valid.

6. A system, comprising:
a distance calculator to:
use a first time of flight to determine a first distance between an access point and a mobile device at a first location;
use a second time of flight to determine a second distance between the access point and the mobile device at a second location; and
obtain a third distance between the first location and the second location; and
a localizer to use the first, second, and third distances to localize the second location; and a time of flight calculator to:
obtain a channel impulse response for a channel between the access point and the mobile device;
use the channel impulse response to determine if a time of arrival of a packet from the mobile device to the access point corresponds to a reflected path between the mobile device and the access point; and
if the time of arrival corresponds to a reflected path, use the channel impulse response to obtain a time of arrival correction; and
use the time of arrival and time of arrival correction to calculate the first time of flight or the second time of flight.

7. The system of claim 6, wherein the distance calculator is to:
use a fourth distance between the access point and the mobile device and a velocity estimate of the mobile device to determine the second distance using a Kalman filter, the fourth distance being determined before the second distance.

8. The system of claim 6, wherein the time of flight calculator is to:
obtain a plurality of channel impulse responses for a plurality of signal paths between the mobile device and a corresponding plurality of antennas of the access point, the channel impulse response being one of the plurality of channel impulse responses;
estimate the time of arrival by combining a plurality of largest channel impulse response components of the plurality of channel impulse.

9. The system of claim 6, wherein the time of flight calculator is to:
combine a plurality of times of arrivals from a plurality of transmissions received from the mobile device to calculate a combined time of arrival; and
use the combined time of arrival to calculate the first time of flight or the second time of flight.

10. The system of claim 6, further comprising:
a step length calculator to:
determine a step length of a user of the mobile device by mapping a step bounce factor of the user to a relationship between step frequency and step length and tracking a step frequency of the user, and
provide a plurality of step lengths obtained while the user moves from the first location to the second location to the distance calculator.

11. A non-transitory computer readable medium storing instructions executable by a processor to:
obtain a heading of a mobile device;
obtain a channel impulse response corresponding to an access point;
use the channel impulse response to estimate a positive bias due to multipath;
use the positive bias to calculate a time of flight;
use the time of flight to determine a first distance from the mobile device to the access point when the mobile device is at a first location;
obtain a second distance from the mobile device to the access point when the mobile device is at the second location;
track a step frequency of a user of the mobile device as the user travels from the first location to the second location;
use a relationship between step frequency and step length to determine a third distance between the first location and the second location; and use the first distance, the second distance, the third distance, and the heading to localize the second location.

12. The non-transitory computer readable medium of claim 11, wherein the instructions are further executable by the processor to:
    obtain a step bounce factor of the user; and
    use the step bounce factor to identify the relationship between step frequency and step length.

13. The non-transitory computer readable medium of claim 12, wherein the instructions are further executable by the processor to:
    obtain the step bounce factor by determining the standard deviation of a scalar projection of an acceleration measurement onto a gravitational measurement;
    obtain a second step frequency; and
    use the second step frequency and the step bounce size to identify the relationship.

14. The non-transitory computer readable medium of claim 11, wherein the instructions are further executable by the processor to:
    obtain a plurality of channel impulse responses of a corresponding plurality of antennas of the access point, the channel impulse response being one of the plurality;
    combine a plurality of largest components of the channel impulse responses to determine the positive bias; use the positive bias to determine a time of arrival; and
    use the time of arrival to determine the time of flight.

* * * * *